United States Patent [19]

Muramoto

[11] Patent Number: 5,060,053

[45] Date of Patent: Oct. 22, 1991

[54] INFORMATION SIGNAL PROCESSING DEVICE

[75] Inventor: Tomotaka Muramoto, Tokyo, Japan

[73] Assignee: Canon Kabushiki Kaisha, Tokyo, Japan

[21] Appl. No.: 543,213

[22] Filed: Jun. 25, 1990

Related U.S. Application Data

[62] Division of Ser. No. 300,823, Jan. 23, 1989, abandoned.

[30] Foreign Application Priority Data

Jan. 28, 1988 [JP] Japan ................................. 63-017566
Sep. 16, 1988 [JP] Japan ................................. 63-231938

[51] Int. Cl.$^5$ .......................... H04N 9/64; H04N 9/88
[52] U.S. Cl. .................................... 358/21 R; 358/36; 358/314
[58] Field of Search ...................... 358/21 R, 36, 314

[56] References Cited

U.S. PATENT DOCUMENTS 4,032,966 6/1977 Kenney et al. ....................... 358/314

FOREIGN PATENT DOCUMENTS

39998 2/1987 Japan .
102591 5/1988 Japan .

Primary Examiner—John W. Shepperd
Attorney, Agent, or Firm—Robin, Blecker, Daley & Driscoll

[57] ABSTRACT

A system is provided for processing an image signal composed of a luminance signal having a second frequency band including a frequency component higher than a frequency component included in a first frequency band and a color signal having the frequency component included in the first frequency band. The luminance signal is separated into a first luminance signal having a frequency component not higher than the frequency component included in the first frequency band and a second luminance signal having a frequency component higher than the frequency component included in the first frequency band. A frequency converter converts the second luminance signal into the first frequency band to output a frequency-converted second luminance signal. A multiplexer multiplexes the input color signal with the second luminance signal to provide a multiplexed signal. A delay unit, having a pass-band for the passage of a signal having the first frequency band, delays the first luminance signal output and the multiplexed signal.

9 Claims, 7 Drawing Sheets

INFORMATION SIGNAL PROCESSING DEVICE

This application is a division of application Ser. No. 300,823, filed Jan. 23, 1989, now abandoned.

BACKGROUND OF THE INVENTION

1. Field of the Invention

This invention relates to an information signal processing device for processing an information signal and more particularly to a device arranged to process an information signal by using a delay element.

2. Description of the Related Art

Heretofore, a delay element called a CCD (charge-coupled device) has popularly been employed as means for delaying, for example, an analog video signal. In the case of a video tape recorder, the CCD is used for circuit elements such as a dropout compensation circuit which is well known and a comb filter which separates a luminance signal and a chrominance signal from a video signal. The CCD has steps the number of which varies according to the delay time, and is arranged to sample and hold an incoming analog signal at a sample-and-hold timing determined by a clock signal of a given frequency fc; and to transfer the analog signal from one step to another for delaying the signal for a period of time as desired.

In principle, the CCD is capable of allowing only a signal of a frequency band which is lower than ½ of the frequency fc of the above-stated clock signal to pass. In other words, the CCD allows only a signal of a frequency band which is lower than a Nyquist frequency to pass. In the actual use of the CCD, the signal frequency which can pass the CCD becomes lower than the Nyquist frequency and is, for example, fc/3, because of the sample-and-hold aperture, the characteristic of a band limiting filter which the signal must pass before the CCD and that of a clock signal removing filter to be arranged to remove the clock signal after the signal is output from the CCD.

During recent years, video tape recorders have come to be arranged to give a picture with a higher quality. As a result, the video signal is required to have a wider frequency band. To meet this trend, the above-stated use of the CCD requires that the frequency fc of the clock signal be raised for the wide band video signal. However, it is difficult at present to raise the clock signal frequency fc up to a value higher than 14 MHz or thereabout for the CCD. Besides, an attempt to raise the clock signal frequency fc is apt to result in an increase in the electric energy consumption and generation of noise components.

SUMMARY OF THE INVENTION

A general object of this invention is to provide an information signal processing device which is capable of solving the above-stated problems of the prior art.

It is a more specific object of this invention to provide an information signal processing device which is capable of delaying and processing an information signal of a wide frequency band by using a delay element adapted for a narrow frequency band, without the fear of any signal deterioration.

To attain this object, an information signal processing device which is arranged as an embodiment of this invention to process an information signal having a second frequency band including a frequency component higher than a frequency component included in a first frequency band, comprises: separation means, arranged to input the information signal, for separating the input information signal into a first information signal having a frequency component not higher than the frequency component included in the first frequency band and a second information signal having a frequency component higher than the frequency component included in the first frequency band and to output the first and second information signals; first frequency converting means for frequency-converting the second information signal output from the separation means into the first frequency band and to output the frequency-converted second information signal; and delay means, having a pass-band for the passage of a signal having the first frequency band, for delaying and outputting the first information signal output from the separation means and the frequency-converted second information signal output from the first frequency converting means.

It is another object of the invention to provide an image signal processing device which is capable of delaying and processing an image signal without deteriorating a luminance signal of a wide frequency band and a color signal despite being a simple structural arrangement.

To attain that object, an image signal processing device arranged as an embodiment of this invention to process an image signal composed of a luminance signal having a second frequency band including a frequency component higher than a frequency component included in a first frequency band and a color signal having the frequency component included in the first frequency band, comprises: first separation means, arranged to input the luminance signal, for separating the input luminance signal into a first luminance signal having a frequency component not higher than the frequency component included in the first frequency band and a second luminance signal having a frequency component higher than the frequency component included in the first frequency band and to output the first and second luminance signals; first frequency converting means for frequency-converting the second luminance signal output from the first separation means into the first frequency band and to output the frequency-converted second luminance signal; multiplexing means, arranged to input the color signal, for multiplexing the input color signal with the second luminance signal output from the first frequency converting means and to output a multiplex signal; and delay means, having a pass-band for the passage of a signal having the first frequency band, for delaying and outputting the first luminance signal output from the first separation means and the multiplex signal output from the multiplexing means.

These and other objects and features of the invention will become apparent from the following detailed description of embodiments thereof taken in connection with the accompanying drawings.

DETAILED DESCRIPTION OF THE PREFERRED EMBODIMENTS

Figure 1:
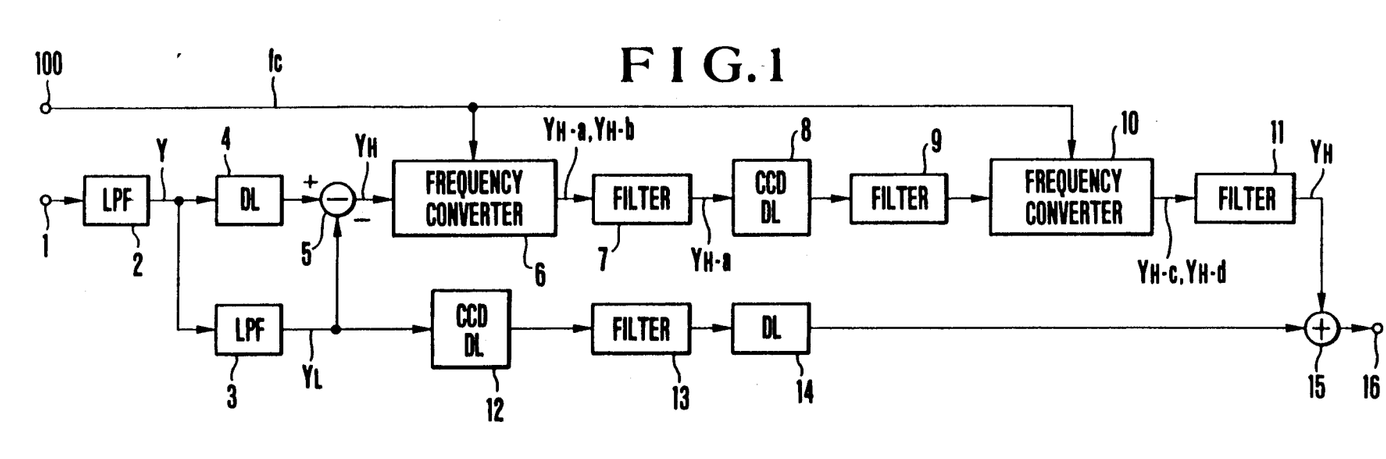
FIG. 1 is a block diagram showing in outline the arrangement of a first embodiment of this invention.

The preferred embodiments of the invention are as described below with reference to the drawings:

FIG. 1 shows a processing circuit which is arranged according to this invention as a first embodiment thereof. Referring to FIG. 1, an input terminal 1 is arranged to input a video signal. Another input terminal 100 is arranged to input a frequency converting carrier signal which is to be supplied to frequency converters 6 and 10. The illustration includes a band limiting filter 2; a low-pass filter (LPF) 3 which is arranged to separate a low frequency component from the video signal; a delay line 4 which has a delay time equal to the delay time of the filter 3; a subtracter 5 which is arranged to subtract the output of the filter 3 from the output of the delay line 4; a frequency converter 6 which is arranged to frequency-convert a high frequency component into a low frequency band; a filter 7 which is arranged to remove a frequency component that is not able to pass the pass-band of a CCD delay line 8 from the output of the frequency converter 6; the CCD delay line 8; a filter 9 which is arranged to remove a clock signal component of the output of the CCD delay line 8; the frequency converter 10 which is arranged to frequency-convert the high frequency component which has been frequency-converted into a low frequency band back into the original frequency band thereof; a filter 11 which is arranged to remove an unnecessary frequency component of the output of the frequency converter 10; a CCD delay line 12 which is arranged to allow the low frequency component of the video signal to pass therethrough; a filter 13 which is arranged to remove a clock signal component of the output of the CCD delay line 12; a delay line 14 which is arranged to adjust a time difference from the frequency-converted signal; an adder circuit 15 which is arranged to add together the high and low frequency components; and a signal output terminal 16.

Figure 2A:
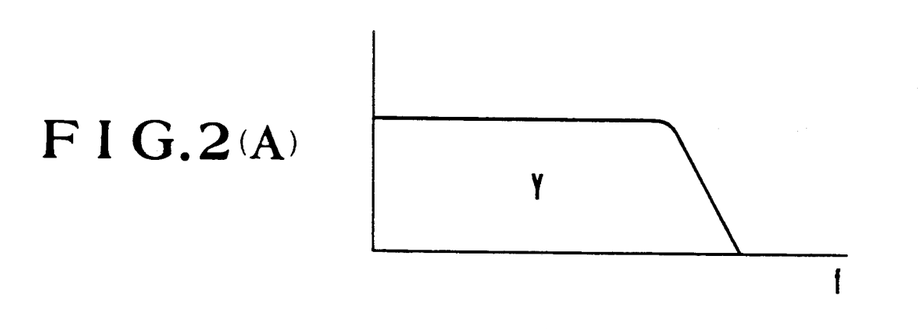
FIGS. 2(A), 2(B), 2(C), 3(A), 3(B), 3(C), 3(D), 4(A), 4(B), 4(C) and 4(D) are graphs showing the operation of the first embodiment of the invention shown in FIG. 1.
Figure 2B:
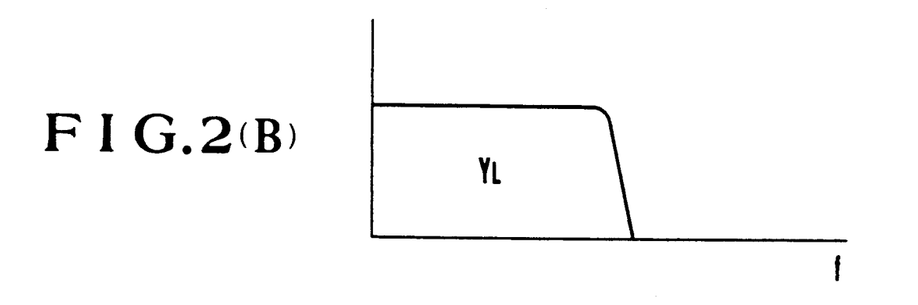
Figure 2C:
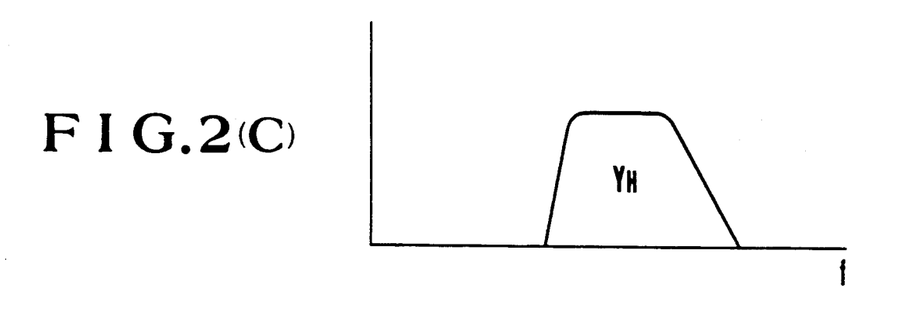

The video signal input at the terminal 1 is supplied to the band limiting filter 2 to have all the signal components which are not included in a necessary frequency band removed from the video signal. The filter 2 thus outputs a video signal Y which has a frequency spectrum as shown in FIG. 2(A). The video signal Y is then supplied to the low-pass filter 3 and the delay line 4. The low-pass filter 3 which is arranged to take out a frequency component that is able to pass the pass-band of the CCD delay line 12 produces a video signal $Y_L$ which has a frequency spectrum as shown in FIG. 2(B). The delay line 4 has a flat amplification characteristic and delay time characteristic. The video signal $Y_L$ output from the filter 3 is supplied to the subtracter 5 as well as to the CCD delay line 12. At the subtracter 5, the video signal $Y_L$ output from the filter 3 is subtracted from the video signal Y output from the delay line 4. By this subtraction, a video signal $Y_H$ which has a high frequency component of the video signal Y as shown in FIG. 2(C) and which is unable to pass the CCD delay line 12 is separated. The video signal $Y_H$ having a high frequency component which has been output from the subtracter 5 as shown in FIG. 2(C) is supplied to the frequency converter 6.

At the frequency converter 6, the high frequency component video signal $Y_H$ which has been output from the subtracter 5 is frequency-converted into a low frequency band which is able to pass the CCD delay line 8 on the basis of a frequency converting carrier signal supplied from the input terminal 100. The high frequency component video signal which has been frequency-converted into a low frequency band passes the filter 7 to remove an unnecessary component and is then supplied to the CCD delay line 8. The delay time of the CCD delay line 8 is arranged to be about equal to that of the CCD delay line 12. The output of the CCD delay line 8 includes a clock signal component used for a CCD. Therefore, the clock signal component is removed by the filter 9. After that, the high frequency component video signal is supplied to the frequency converter 10 to be converted back into its original high frequency band. The high frequency component video signal which is thus obtained is supplied to the filter 11 to have an unnecessary component removed from the signal. After passing the filter 11, the high frequency component video signal is supplied to the adder 15.

Meanwhile, the low frequency component video signal which is supplied to the CCD delay line 12 is delayed for a given period of time. After that, the signal is supplied to the filter 13 to have the clock signal component removed therefrom. The low frequency component video signal is then supplied to the delay line 14. The delay line 14 is provided for adjustment of a time difference between the high and low frequency components of the video signal which have been separated from each other. The high frequency component video signal and the low frequency component video signal which have been thus time-adjusted to each other are added together by the adder 15. As a result, the adder 15 outputs a video signal which has the same frequency band as that of the original video signal and which has been delayed for a given period of time. The video signal thus delayed is supplied to the output terminal 16.

In the first embodiment which is arranged as described above, the low-pass filter 3, the delay line 4 and the subtracter 5 are employed as means for separating the high and low frequency components. This arrangement in principle enables the video signal to be perfectly restored to its original wave form from the separated high and low frequency components. The arrangement of the embodiment thus excellently reproduces the wave form.

Figure 3A:
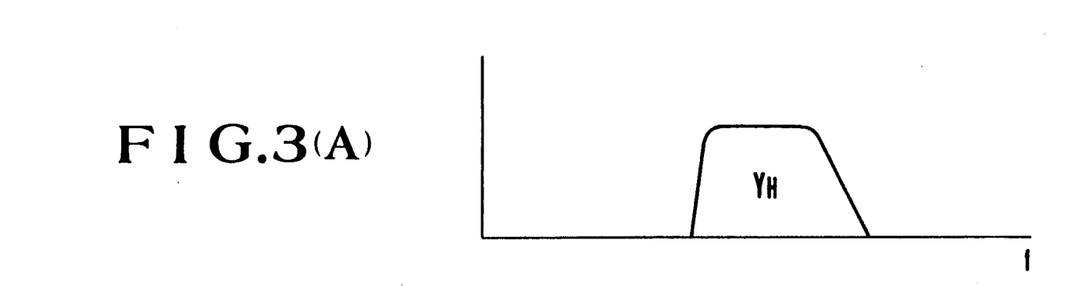
Figure 3B:
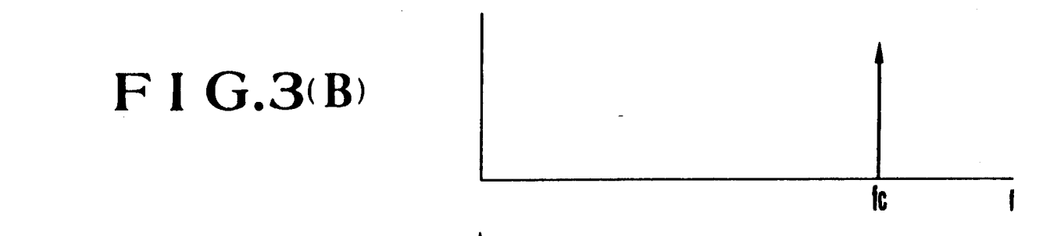
Figures 3C, 3D:
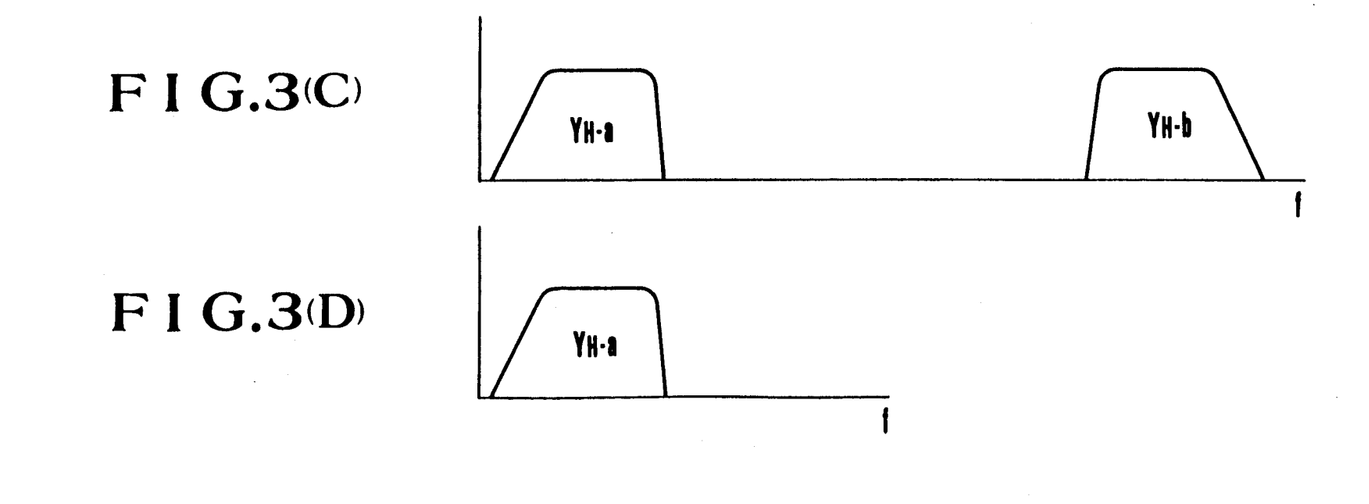

Referring again to FIG. 1, the frequency converting carrier signal which is supplied via the input terminal 100 to the frequency converter 6 is arranged to cause the frequency converter 6 to operate in the following manner: In a case where a carrier signal fc which is arranged to have a frequency spectrum near the upper limit frequency of the high frequency component video signal $Y_H$ (see FIG. 3(A)) as shown in FIG. 3(B) is used as the frequency converting carrier signal, the frequency converter 6 uses this carrier signal fc to balanced-modulate the video signal $Y_H$ into a video signal having frequency spectra $Y_{H-a}$ and $Y_{H-b}$ as shown in FIG. 3(C). In the video signal output from the frequency converter 6, the frequency spectrum $Y_{H-a}$ which is shown in FIG. 3(C) represents a signal having a frequency band which is able to pass the CCD delay line 8.

The frequency spectrum $Y_{H-b}$ which is shown in FIG. 3(C) is removed by the filter 7 from the video signal output from the frequency converter 6. Then, the video signal is supplied to the CCD delay line 8 with the frequency spectrum $Y_{H-a}$ alone separated as shown in FIG. 3(D). Further, the filter 7 should be a low-pass filter having its cut-off frequency near the upper limit frequency of the video signal $Y_H$. However, since the frequency spectra $Y_{H-a}$ and $Y_{H-b}$ are located away from each other as shown in FIG. 3(C), the video signal does not require use of a low-pass filter of a steep cut-off characteristic. Therefore, any low-pass filter can be employed as the filter 7 so far as it does not have any adverse effect on the phasic characteristic of the separated frequency spectrum $Y_{H-a}$.

Figure 4A:
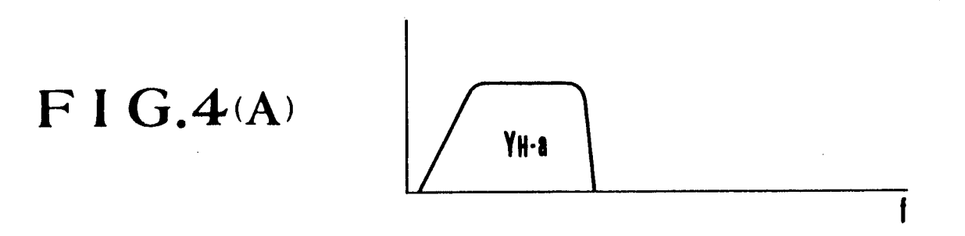
Figure 4B:
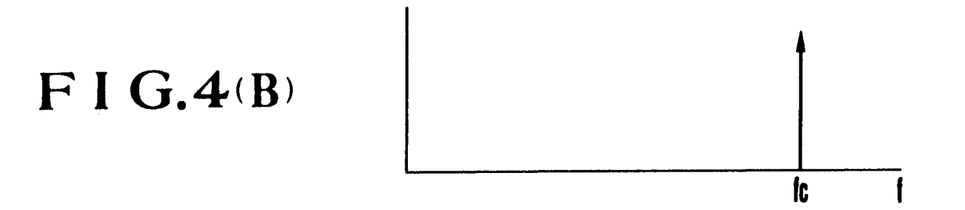

Further, in the above-stated case, the frequency converter 10 is supplied with the video signal $Y_{H-a}$ from which the clock signal component for a CCD has been removed by the filter 9 and the carrier signal fc which has been input at the carrier signal input terminal 100 and which has a frequency spectrum near the upper limit frequency of the video signal $Y_H$ as shown in FIG. 4(B). The frequency converter 10 then balanced-modulates the video signal $Y_{H-a}$ (see FIG. 4(A)) by using the carrier signal fc. The video signal $Y_{H-a}$ is thus converted into a video signal which has frequency spectra $Y_{H-c}$ and $Y_{H-d}$ as shown in FIG. 4(C).

Figure 4C:
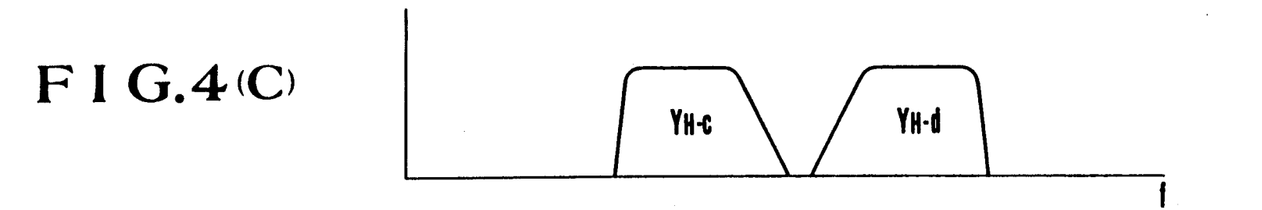
Figure 4D:
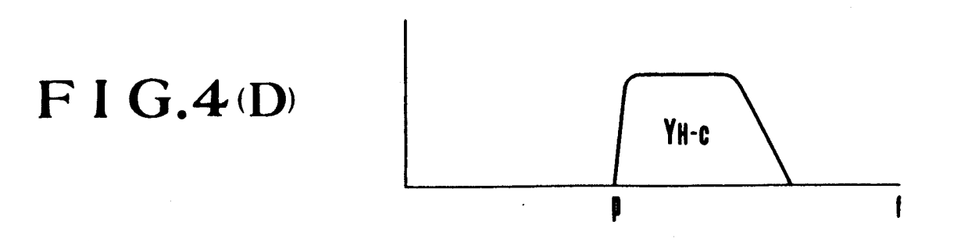

The video signal output from the frequency converter 10 is supplied to the filter 11 to have the frequency spectrum $Y_{H-d}$ which is shown in FIG. 4(C) removed from the video signal. Then, as shown in FIG. 4(D), the frequency spectrum $Y_{H-c}$ is alone separated and supplied to the adder 15 in the form of the video signal $Y_H$ which is obtained before the frequency conversion into a low frequency band.

The above-stated filter 11 has its cut-off frequency near the upper limit frequency of the video signal $Y_H$ and has a steep cut-off characteristic. However, since the cut-off frequency is near the upper limit frequency of the video signal $Y_H$, the filter 11 never has an adverse effect on the phase of the video signal obtained in the vicinity of a boundary frequency P obtained between the video signal $Y_L$ and the video signal $Y_{H-c}$ as shown in FIG. 4(D). The low frequency component video signal $Y_L$ which is supplied to the CCD delay line 12 is delayed for a given period of time. After that, the signal $Y_L$ is supplied to the filter 13 to have the clock signal component removed therefrom and is then supplied to the delay line 14. The delay line 14 is provided for adjustment of a time difference between the high frequency component video signal $Y_H$ and the low frequency component video signal $Y_L$ which have been separated from each other in the manner as described in the foregoing. The high frequency component video signal $Y_H$ and the low frequency component video signal $Y_L$ which have been time-adjusted in this manner are supplied to the adder 15 to be added together and made into a video signal which has the same frequency band as the original signal and which has been delayed for a given period of time. The video signal thus obtained is output from the output terminal 16.

In the first embodiment which is arranged as described above, the frequency converting carrier signal is arranged to have the frequency spectrum which is close to the upper limit frequency of the high frequency component video signal $Y_H$. Balanced modulation is performed by using this carrier signal. This effectively prevents the adverse effect of the phasic characteristic of the filter 7 or 11 and thus obviates the necessity of any additional arrangement for phase correction.

Figure 5:
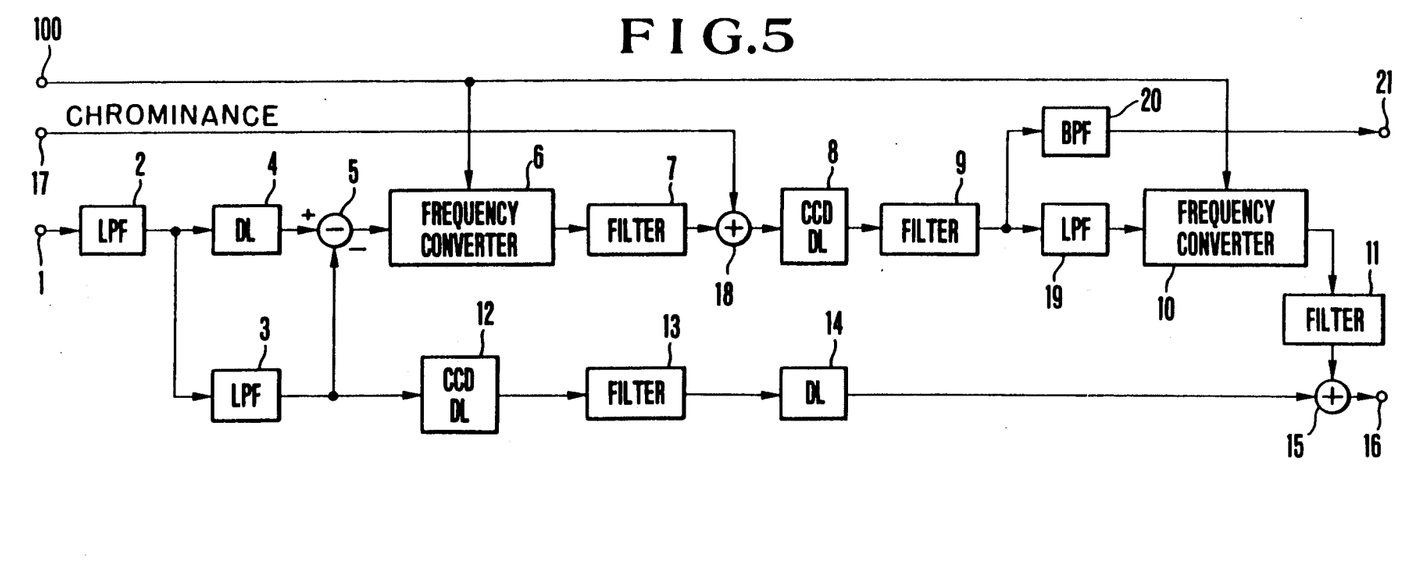
FIG. 5 is a block diagram showing in outline the arrangement of a second embodiment of this invention.

FIG. 5 is a block diagram showing a processing circuit which is arranged according to the invention as a second embodiment thereof. In FIG. 5, the same component parts as those of FIG. 1 are indicated by the same reference numerals and the details of them are omitted from the following description of the second embodiment:

Referring to FIG. 5, an input terminal 17 is arranged to input a chrominance signal which has been modulated with a subcarrier. An adder 18 is arranged to add the chrominance signal to a luminance signal which has been frequency-converted into a low frequency band. A low-pass filter 19 is arranged to separate the luminance signal from a multiplex signal consisting of the luminance signal and the chrominance signal. A band-pass filter 20 is arranged to take out the chrominance signal from the multiplex signal consisting of the luminance signal and the chrominance signal. An output terminal 21 is arranged to output the chrominance signal.

The high frequency component of the luminance signal which has been frequency-converted into a low frequency band and which has been output from the filter 7 and the chrominance signal which has been modulated with the subcarrier and which has been input at the input terminal 17 are multiplexed by the adder 18 to form a multiplex signal.

The multiplex signal consisting of the high frequency component of the luminance signal which has been frequency-converted into a low frequency band and the chrominance signal is delayed by a CCD delay line 8 for a given period of time. The delayed multiplex signal is supplied to a filter 9 to have the clock signal component for a CCD removed therefrom. After that, the multiplex signal is supplied to the low-pass filter 19 and the band-pass filter 20. At the low-pass filter 19, the luminance signal component is separated and taken out to be supplied to the frequency converter 10. At the band-pass filter 20, the chrominance signal component is separated and taken out to be output from an output terminal 21.

The modulated chrominance signal is within a relatively narrow frequency band having the subcarrier in the middle of the band. Meanwhile, the high frequency component of the luminance signal which has been frequency-converted into a low frequency band is within a relatively low frequency band. Therefore, in the case of the second embodiment described, one and the same delay line can be used both for the chrominance signal and for the luminance signal taking the advantage of these facts.

Figure 6:
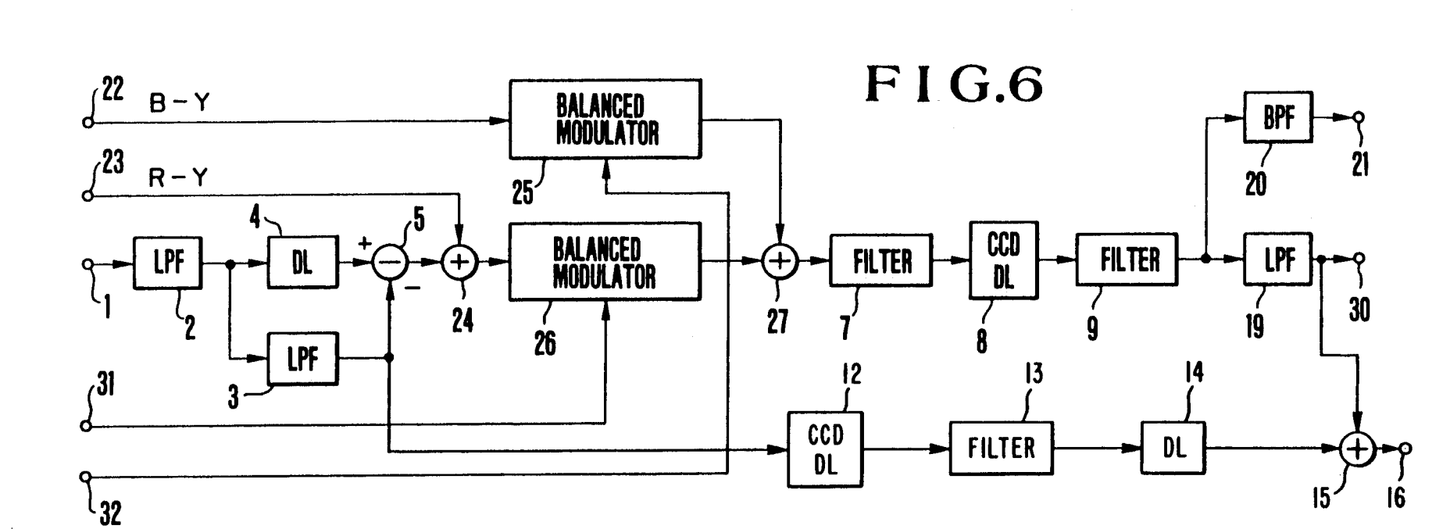
FIG. 6 is a block diagram showing in outline the arrangement of a third embodiment of this invention.

FIG. 6 shows a processing circuit arranged as a third embodiment of the invention. In FIG. 6, the same component parts as those of FIGS. 1 and 5 are indicated by the same reference numerals and their details are omitted from the following description of the third embodiment: Referring to FIG. 6, an input terminal 22 is arranged to input a color-difference signal B-Y. An input terminal 23 is arranged to input a color-difference signal R-Y. An adder 24 is arranged to add the signal R-Y to the high frequency component of a luminance signal. A balanced modulator 25 is arranged to modulate the signal B-Y. Another balanced modulator 26 is arranged to modulate the signal R-Y. An adder 27 is arranged to add the modulated signal R-Y and the modulated signal B-Y together. An input terminal 31 is arranged to input a subcarrier signal. An input terminal 32 is arranged to input another subcarrier signal which has a 90 degree phase difference from the subcarrier signal input by the input terminal 31.

The third embodiment which is shown in FIG. 6 is arranged in the same manner as in the cases of the first and second embodiments up to a point where the high frequency component of the luminance signal supplied via the input terminal 1 is alone output from the subtracter 5. In the case of the third embodiment, the high frequency component of the luminance signal is added by the adder 24 to the color difference signal R-Y supplied via the input terminal 23. The output of the adder 24 is supplied to the balanced modulator 26. At the balanced modulator 26, balanced modulation is performed on the output of the adder 24 with the subcarrier supplied via the input terminal 31. By the balanced modulation, the high frequency component of the luminance signal is frequency-converted into a low frequency band while, at the same time, the signal R-Y is amplitude-modulated.

These processes are shown in FIGS. 2(A) to 2(C) and 7(A) to 7(D). FIG. 2(A) shows the spectrum of the luminance signal which has passed the low-pass filter (LPF) 2 of FIG. 6. The low frequency component of the luminance signal of FIG. 2(A) is alone separated by passing the LPF 3 as shown in FIG. 2(B). The high frequency component of the luminance signal of FIG. 2(A) is alone separated as shown in FIG. 2(C) by subtracting at the subtracter 5 the signal of FIG. 2(B) from the signal of FIG. 2(A) which has passed the delay line 4 for time adjustment.

Figure 7A:
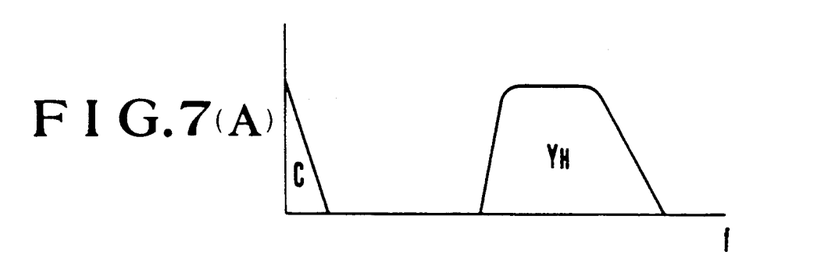
FIGS. 7(A), 7(B), 7(C) and 7(D) show the operation of the third embodiment shown in FIG. 6.
Figure 7B:
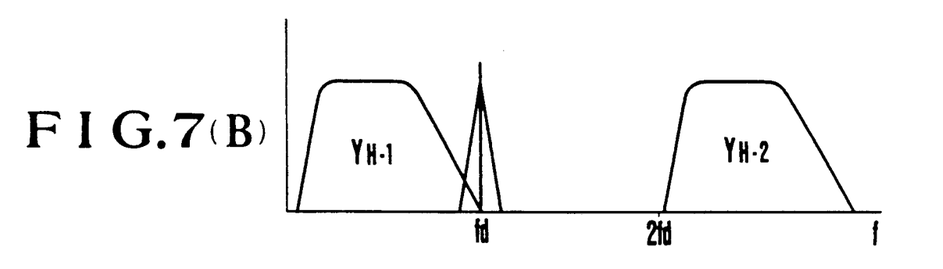
Figure 7C:
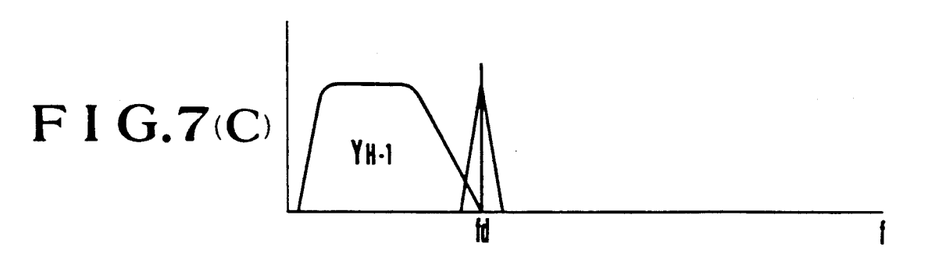
Figure 7D:
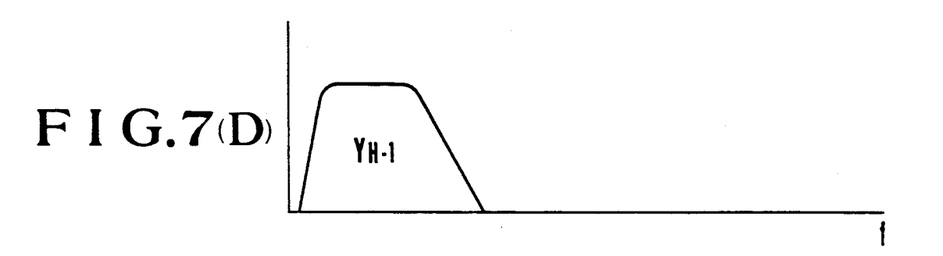

Next, when the color-difference signal R-Y which has been supplied via the input terminal 23 of FIG. 6 is added by the adder 24 to the signal of FIG. 2(C), the spectrum of the signal becomes as shown in FIG. 7(A). When the signal of FIG. 7(A) is modulated by the balanced modulator 26 with a subcarrier fd, the signal becomes as shown in FIG. 7(B). As is apparent from FIG. 7(B), the balanced modulation with the subcarrier fd brings the high frequency component of the luminance signal into a state which is equivalent to a state in which it has been frequency-converted into a low frequency band. Then, a component YH-2 which is shown in FIG. 7(B) and which is unnecessarily generated is removed by means of the filter 7. By this, a multiplex signal which consists of the high frequency component of the luminance signal and the modulated chrominance signal is obtained as shown in FIG. 7(C).

Meanwhile, the color-difference signal B-Y which has been supplied via the input terminal 22 is modulated by the balanced modulator 25 with the subcarrier supplied via the input terminal 32. The modulated signal B-Y is added by the adder 27 to the other color-difference signal R-Y and the high frequency component of the luminance signal. The phase of the subcarrier which is supplied via the input terminal 32 differs 90 degrees from that of the subcarrier which is supplied via the input terminal 31. Therefore, the color-difference signals come to assume a quadrature two-phase modulated state.

The multiplex signal consisting of these signals thus obtained passes the CCD delay line 8 of FIG. 6 and is then supplied to the filter 9 to have the clock signal component removed therefrom. After that, the output of the filter 9 is supplied to the low-pass filter (LPF) 19 to take out the high frequency component of the luminance signal and is also supplied to the band-pass filter (BPF) 20 to separate the chrominance signal.

The arrangement of the third embodiment described permits the combined use of one and the same circuit both for modulation of the color-difference signal and for frequency-conversion of the high frequency component of the luminance signal into a low frequency band. Therefore, this permits simplification of the circuit arrangement.

Figure 8:
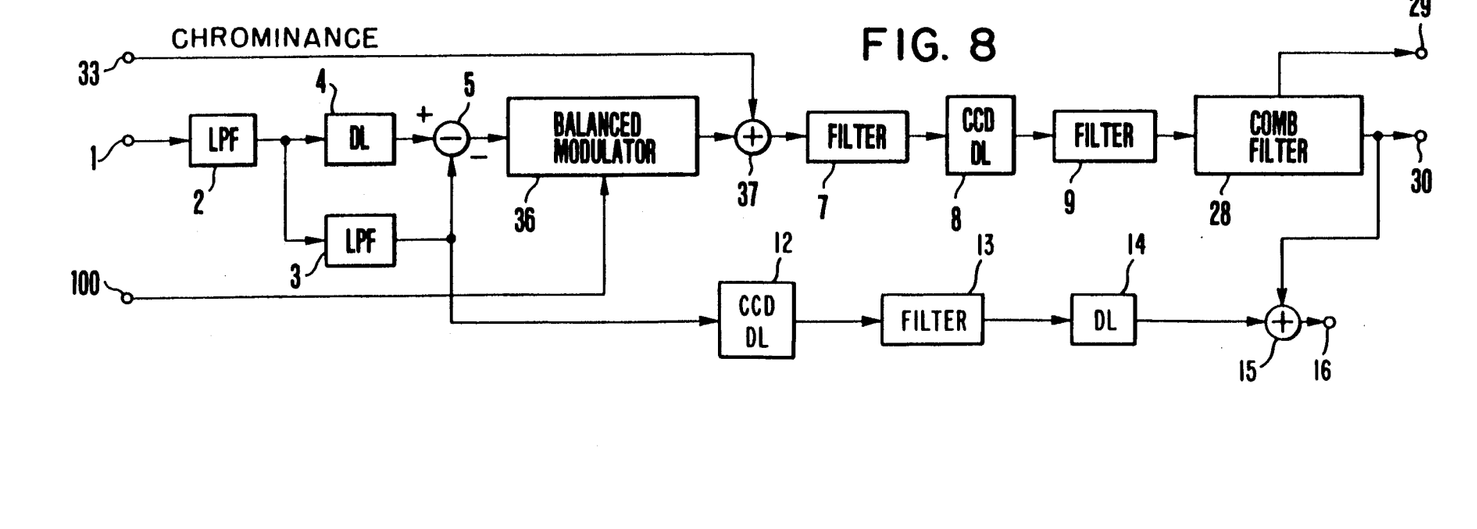
FIG. 8 is a block diagram showing in outline the arrangement of a fourth embodiment of this invention.

FIG. 8 shows a processing circuit which is arranged as a fourth embodiment of the invention. In FIG. 8, the same component parts as those of FIG. 1 are indicated by the same reference numerals and the details of them are omitted from the following description of the fourth embodiment: Referring to FIG. 8, an input terminal 33 is arranged to input a chrominance signal which has been quadrature two-phase modulated with a subcarrier. An input terminal 100 is arranged to input a frequency converting carrier signal. A balanced modulator 36 is arranged to frequency-convert the high frequency component of a luminance signal into a low frequency band. An adder 37 is arranged to add the modulated chrominance signal to the high frequency component of the luminance signal which has been frequency-converted into the low frequency band.

The luminance signal which has been supplied to the terminal 1 has the high frequency component thereof alone separated and output from the subtracter 5 in the same manner as in the cases of the first, second and third embodiments. The high frequency component is frequency-converted by the balanced modulator 36 with the carrier signal supplied via the input terminal 100 into a low frequency band. After that, the frequency-converted high frequency component is added by the adder 37 to the modulated chrominance signal.

Any unnecessary part of the high frequency component of the luminance signal which has been added to the chrominance signal is removed by the filter 7. The output of the filter 7 is delayed for a given period of time by the CCD delay line 8. The clock signal component of the output of the CCD delay line 8 is removed by the filter 9. The output of the filter 9 is supplied to a comb filter 28. At the comb filter 28, the high frequency component of the luminance signal and the chrominance signal are separated from each other to be output from output terminals 30 and 29, respectively.

In the fourth embodiment, the use of the comb filter 28 enables separation of the high frequency component of the luminance signal from the chrominance signal to be carried out in an ideal manner. In addition to that, the line interpolation can be accomplished for the chrominance signal by virtue of the comb filter 28.

Figure 9:
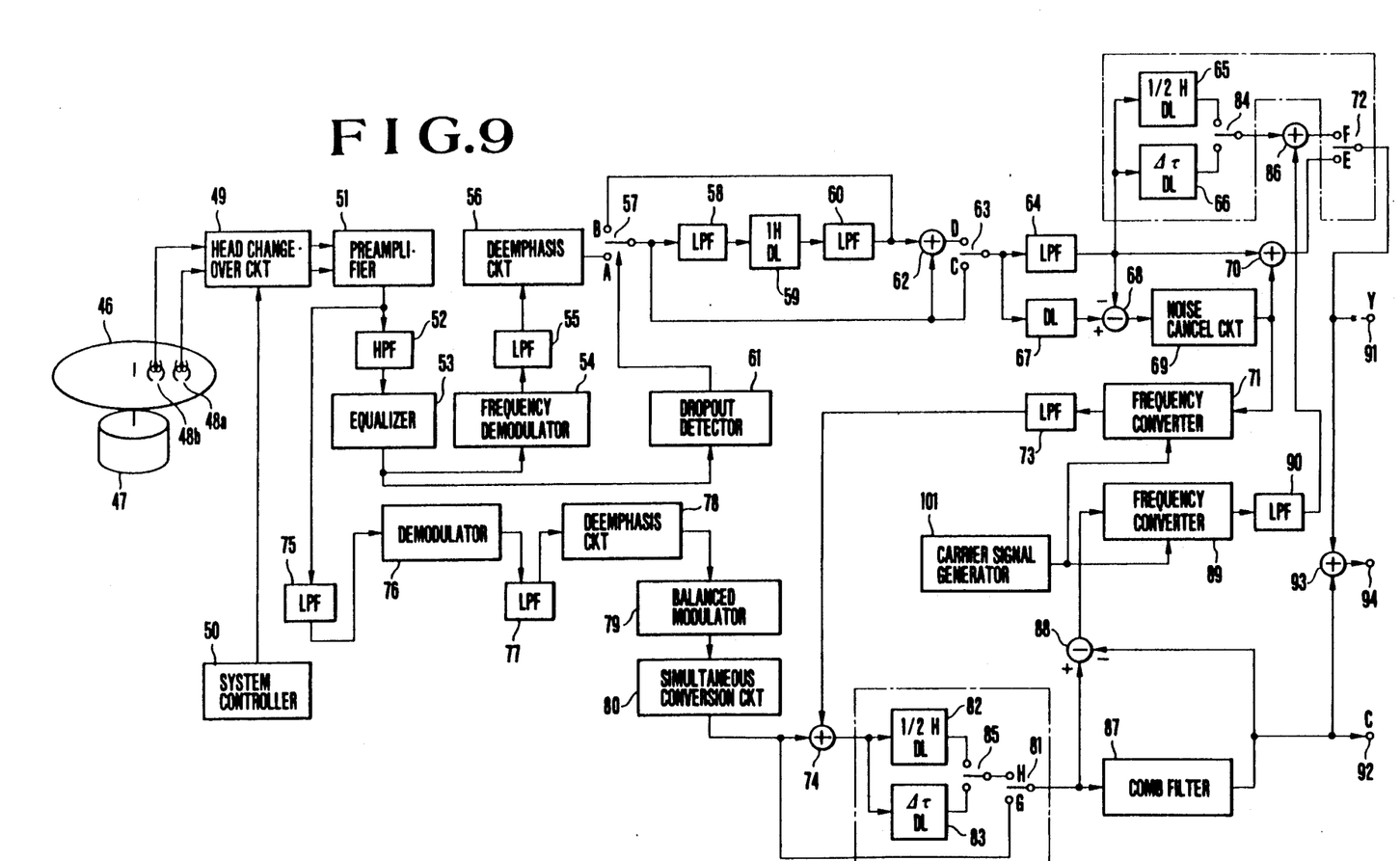
FIG. 9 is a block diagram showing in outline the arrangement of a fifth embodiment of this invention.

FIG. 9 shows in outline the arrangement of a fifth embodiment of this invention. In this case, the invention is applied to the skew compensation circuit of a still image reproducing apparatus.

In FIG. 9, the illustration includes a magnetic disc 46; a motor 47 which drives the magnetic disc 46 to rotate; magnetic heads 48a and 48b which are arranged to reproduce a still image signal recorded on the magnetic disc 46; a head change-over circuit 49 which is arranged to output the still image signal reproduced by these heads 48a and 48b by switching their outputs from one over to the other; a system controller 50 which is arranged to control the operation of the apparatus; a preamplifier 51; a high-pass filter 52; an equalizer 53 which is used for a luminance signal processing system; a frequency demodulator 54 for a luminance signal; a low-pass filter 55; a deemphasis circuit 56; a switch 57 which is provided for dropout compensation; a low-pass filter 58 for band limitation; a CCD delay line 59 for one horizontal scanning period (hereinafter referred to as H); a low-pass filter 60 which is arranged to remove a clock signal component from the output of the CCD delay line 59; a dropout detector 61; an adder 62 which is arranged to average the luminance signal delayed for a period of one H and the luminance signal not delayed by adding them together; a switch 63 which is provided for selecting either the luminance signal which is added and averaged or the luminance signal which is not averaged; a low-pass filter 64 for taking out a low frequency component of the luminance signal; a ½H delay line 65 which is provided for skew compensation; a delay line 66 which is arranged to delay for a very short period of time $\Delta\tau$ the input signal thereof in such a way as to cause a time difference between its input signal and a signal output from the ½H delay line 65 to be exactly ½ horizontal scanning period; a delay line 67 which is arranged to have a delay time equal to the delay time of the low-pass filter 64; a subtracter 68 which is arranged to take out only the high frequency component of the luminance signal by subtracting a low frequency component from the luminance signal; a noise cancel circuit 69 which is arranged to remove any noise component included in the high frequency component of the luminance signal; an adder 70 which is provided for adding the high and low frequency components of the luminance signal together; a frequency converter 71 which is arranged to frequency-convert the high frequency component of the luminance signal into a low frequency band; a carrier signal generator 101 which is arranged to generate a carrier signal for frequency conversion; a switch 72 arranged to output the signal which has undergone a skew compensating process or the signal which has not undergone that process by switching one over to the other; a low-pass filter 73 which is provided for removal of any unnecessary part of the high frequency component of the luminance signal which has been frequency-converted into a low frequency band; an adder 74 which is arranged to add together the chrominance signal and the high frequency component of the luminance signal frequency-converted into a low frequency band; a low-pass filter 75 which is provided for separating a frequency-modulated color-difference line-sequential signal component from the image signal; a demodulator 76 which is arranged to demodulate the frequency-modulated color-difference line-sequential signal into a baseband signal; a low-pass filter 77; a deemphasis circuit 78 which is provided for the color-difference line-sequential signal; a balanced modulator 79 which is arranged to balanced-modulate the color-difference line-sequential signal with a subcarrier; a simultaneous conversion circuit 80 which is arranged to bring the balanced-modulated color-difference line-sequential signal into a line-simultaneous state and to form thereby a chrominance signal; a switch 81 arranged to output the signal which has been skew-compensated or the signal which is not skew-compensated by switching them from one over to the other; a ½H delay line 82 which is provided for skew compensation; a delay line 83 which is arranged to delay for a very short period of time $\Delta\tau$ the input signal thereof in such a way as to cause a time difference between the input signal and a signal output from the ½H delay line 82 to be exactly the period of ½H (horizontal scanning period); switches 84 and 85 which are arranged to perform a switching action between the ½H delayed signal and the signal delayed for the above-stated very short period of time $\Delta\tau$; an adder 86 which is arranged to add together the high and low frequency components of the luminance signal; a comb filter 87 which is arranged to separate the chrominance signal from a multiplex signal obtained by multiplexing the chrominance signal and the high frequency component of the luminance signal frequency-converted into a low frequency band; a subtracter 88 arranged to extract the low-frequency-band-converted high frequency component of the luminance signal by subtracting the chrominance signal from the multiplex signal which consists of the chrominance signal and the low-frequency-band-converted high frequency component of the luminance signal; a frequency converter 89 which is arranged to frequency-convert the high frequency component of the luminance signal which has been frequency-converted into a low frequency band back into the original high frequency band thereof; a low-pass filter 90 which is arranged to remove any unnecessary part of the high frequency component of the luminance signal which has been frequency-converted into a high frequency band; an output terminal 91 which is arranged to output a wide-band luminance signal; an output terminal 92 which is arranged to output the chrominance signal; an adder 93 which is arranged to add together the wide-band luminance signal and the chrominance signal; and an output terminal 93 which is arranged to output a composite color still image signal.

The still image reproducing apparatus shown in FIG. 9 is arranged to operate either in a field record reproducing mode or in a frame record reproducing mode. The field record reproducing mode is as follows: In recording a still image, one field portion of an image signal is recorded in one of recording tracks provided on the magnetic disc 46. In reproducing, the record in the record track is continuously reproduced to give a still image. The frame record reproducing mode is as follows: In recording, an odd-number field portion of an image signal and an even-number field portion of the image signal are recorded in two adjacent recording tracks on the magnetic disc 46. For reproduction, these image signal records are alternately reproduced to give a still image by switching them from one over to the other for every field period.

In recording the still image signal on the magnetic disc 46, an index (ID) signal which indicates a recording mode selected for recording is recorded along with the still image signal. Then, in reproducing the record, a reproducing action is performed in a reproducing mode corresponding to the recording mode indicated by the ID signal.

Again referring to FIG. 9, when the magnetic disc 46 which is stowed in a jacket (not shown) is loaded on the still image reproducing apparatus and is set in position, this is detected by a disc position detector which is not shown. Upon receipt of information on this, the system controller 50 instructs the motor 47 to rotate. The motor 47 then drives the magnetic disc 46 to rotate at a given rotational frequency. When the magnetic disc 46 comes to stably rotate at the given rotational frequency, the system controller 50 instructs a head shifting mechanism (not shown) to cause the magnetic heads 48a and 48b to trace the record tracks one after another over the magnetic disc 46. Then, for example, the magnetic head 48a extracts the ID signal from the signal reproduced from each record track. By this, the recording mode in which the still image signal is recorded in each of the record tracks can be discriminated as between the field record mode and the frame record mode. The result of the discrimination is stored in the system controller 50.

When any recording track is selected as desired through an operation part (not shown) from among a plurality of record tracks formed on the magnetic disc 46 and then the system controller 50 is instructed to start a reproducing action, the system controller 50 instructs the head shifting mechanism to begin to shift the heads. In response to the instruction, the head shifting mechanism shifts the magnetic heads 48a and 48b to the position of the recording track designated by the operation part. The shifting action on the magnetic heads 48a and 48b is brought to a stop when the heads reach the designated track position.

After causing the magnetic heads 48a and 48b to be shifted to the designated record track position as described above, the system controller 50 checks the result of the ID signal discrimination stored in a memory within the system controller 50 for confirmation as to whether the still image signal recorded in the designated record track is in the field record mode or in the frame record mode. The system controller 50 then controls the operation of the head change-over circuit 49 according to the kind of the record mode confirmed.

In other words, when the still image signal recorded in the designated record track is found to be in the field record mode, the system controller 50 operates in the field reproducing mode. In this case, the signal obtained from the magnetic head 48a is supplied to the preamplifier 51. If the still image signal is found to be recorded in the frame record mode, the system controller 50 operates in the frame reproducing mode. The system controller 50 then controls the head change-over circuit 49 in such a way as to have the signals which are obtained by the magnetic heads 48a and 48b alternately supplied for every field period to the preamplifier 51 which is located next to the circuit 49.

After amplification by the preamplifier 51, the still image signal reproduced from the magnetic disc 46 in the above-stated manner is supplied to the high-pass filter (HPF) 52 and to the low-pass filter (LPF) 75. At the HPF 52, a frequency-modulated luminance signal is separated from the image signal. At the LPF 75, a frequency-modulated color-difference line-sequential signal is separated from the image signal.

The frequency-modulated luminance signal which is separated by the HPF 52 is supplied to the equalizer 53 to undergo a frequency correcting process. Then, the frequency-corrected luminance signal is demodulated by the frequency demodulator 54; the signal has any redundant frequency component removed by the LPF 55; and, after that, the signal is subjected to a deemphasizing process at the deemphasis circuit 56 which has a characteristic reverse to an emphasizing process carried out in recording. The deemphasized signal is supplied to one side A of the switch 57. The luminance signal output from the deemphasis circuit 56 is thus supplied to a dropout compensation circuit consisting of the switch 57, the LPFs 58 and 60, the one horizontal scanning period delay line (hereinafter referred to as 1H DL) 59 and the dropout detector 61.

The dropout compensation circuit operates as follows: The luminance signal which has been output from the deemphasis circuit 56 is normally supplied to one side A of the switch 57. The signal output from the switch 57 is supplied as it is to the adder 62 and one side C of the switch 63. At the same time, the signal output from the switch 57 is supplied also to the 1H DL 59 via the LPF 58 to be delayed for one horizontal scanning period. The signal thus delayed is supplied via the LPF 60 to the other side B of the switch 57 and also to the adder 62. Further, the connecting position of the switch 57 is caused by the dropout detector 61 to remain on its side B throughout any period during which the envelope of the frequency-modulated luminance signal output from the equalizer 53 abruptly changes, i.e. while a drop-out takes place. The switch 57 then outputs the luminance signal which has been dropout-compensated by using a signal portion obtained one H period before.

To the adder 62 are supplied the signal output from the switch 57 and the signal portion which precedes it by one H period and which has been delayed one H period by the 1H DL 59. The adder 62 then produces an averaged signal which is obtained by averaging the two signal inputs. The output of the adder 62 is supplied to the other side D of the switch 63. The switch 63 is arranged to have its connecting position shifted alternately to the two sides C and D thereof for every vertical scanning period. In the frame reproducing mode, the position of the switch 63 is controlled by the system controller 50 to be on the side C for the purpose of enhancing the picture quality obtained in the field reproducing mode.

The signal output from the switch 63 is supplied to the LPF 64 to have its frequency band limited to a band which is able to pass the ½ horizontal scanning period delay line (hereinafter referred to as ½H DL) 65. The output of the LPF 64 is supplied to the ½H DL 65 and the delay line ($\Delta\tau$ DL) 66. The output of the switch 63 is supplied to the delay line (DL) 67 to be delayed for a period of time which is equal to the delay time of the LPF 64. After that, the output of the LPF 64 is subtracted from the output of the DL 67 by the subtracter 68. As a result, the high frequency component of the luminance signal is alone separated by the subtracter 68. The high frequency component is supplied to the noise cancel circuit (NC) 69 to have any noise component removed therefrom and is then supplied to the adder 70 and the frequency converter 71. At the adder 70, the low frequency component of the luminance signal output from the LPF 64 and the high frequency component of the luminance signal from which the noise component has been removed by the NC 69 are added together. As a result, the adder 70 outputs the luminance signal restored to its original frequency band. The signal thus restored is supplied to one side E of the switch 72.

Meanwhile, the high frequency component of the luminance signal which has been supplied to the frequency converter 71 is subjected to a balanced modulation process which is carried out with a frequency converting carrier signal generated by the carrier signal generator 101. The converter 71 thus frequency-converts the high frequency component of the luminance signal into a low frequency band. The output of the converter 71 is then supplied to the adder 74 via the LPF 73.

The frequency-modulated color-difference line-sequential signal which has been separated by the LPF 75 from the reproduced still image signal is demodulated into a baseband signal by the demodulator 76. The output of the demodulator 76 is supplied to the deemphasis circuit 78 to be subjected to a deemphasizing process which has a characteristic reverse to the emphasizing process performed in recording. The output of the deemphasis circuit 78 is supplied to the balanced modulator 79 to be subjected to a balanced modulation process which is carried out with a subcarrier signal. The output of the balanced modulator 79 is supplied to the simultaneous conversion circuit 80 which is composed of a comb filter. Then, the color-difference line-sequential signal is processed by the simultaneous conversion circuit 80 into a line-simultaneous state to form a chrominance signal. The chrominance signal thus formed is supplied to the adder 74 and also to one side G of the switch 81.

At the adder 74, the high frequency component of the luminance signal which has been frequency-converted into a low frequency band and the chrominance signal which has been output from the simultaneous conversion circuit 80 are added together. The signal output from the adder 74 thus obtained is supplied to the ½H DL 82 and the Δτ DL 83.

The low frequency component of the reproduced luminance signal is delayed by the ½H DL 65 and the Δτ DL 66. After that, the outputs of these delay lines are supplied to the terminals of the switch 84. The high frequency component of the reproduced luminance signal is delayed by the ½H DL 82 and the Δτ DL 83 together with the chrominance signal. The outputs of these delay lines are then supplied to the terminals of the switch 85. Further, the connecting position of each of these switches 84 and 85 is alternately shifted between the ½H DL 65 or 82 and the Δτ DL 66 or 83 for every vertical scanning period. As a result of these switching actions, the low frequency component of the luminance signal which has undergone the skew compensating process is supplied from the switch 84 to the adder 86. The high frequency component of the luminance signal which also has been skew compensated is supplied along with the chrominance signal from the switch 85 to one side H of the switch 81.

Switches 72 and 81 are provided for selection between inclusion and exclusion of the skew compensating process according to the reproducing mode. The system controller 50 is arranged to control the connecting positions of the switches 72 and 81 as follows: The switch 72 is connected to its side F and the switch 81 to its side H in the field reproducing mode. In this instance, the skew-compensated high frequency component of the luminance signal and the chrominance signal are supplied via the switch 81 to the comb filter 87 and the subtracter 88. The comb filter 87 then separates only the chrominance signal and supplies it to the chrominance signal output terminal 92, the adder 93 and the subtracter 88.

The subtracter 88 subtracts from the output of the switch 81 the chrominance signal which is separated by the comb filter 87 and produces the high frequency component of the luminance signal which has been frequency-converted into a low frequency band. The low-frequency-band-converted high frequency component of the luminance signal which has thus been output from the subtracter 88 is supplied to the frequency converter 89 to undergo balanced modulation which is carried out with a frequency converting carrier signal supplied from the carrier signal generator 101. The high frequency component is brought back to its original high frequency band by the balanced modulation and is then supplied via the LPF 90 to the adder 86. At the adder 86, the high frequency component is added to the low frequency component of the luminance signal to have the luminance signal restored to its wide frequency band. The restored luminance signal is supplied to the luminance signal output terminal 91 and the adder 93 via the switch 72 the connecting position of which is then on the side F. Since the chrominance signal which has been separated from the output of the switch 81 by the comb filter 87 is also supplied to the adder 93, the adder 93 produces and supplies to the output terminal 94 a composite color still image signal such as, for example, a TV signal of the NTSC color system.

In the field reproducing mode, as described above, the skew-compensated luminance signal, the chrominance signal and the composite color still image signal are output from the output terminals 91, 92 and 94, respectively.

In the frame reproducing mode, the system controller 50 causes the connecting position of the switch 72 to be on its side E and that of the switch 81 to be on its side G. The chrominance signal output from the simultaneous conversion circuit 80 is then supplied via the switch 81 and the comb filter 87 to the chrominance signal output terminal 92 and the adder 93. The wideband luminance signal which is output from the adder 70 is supplied to the luminance signal output terminal 91 and the adder 93 via the switch 72 which has its connecting position on the side E. As a result, the composite color still image signal is supplied from the adder 93 to the output terminal 94.

As described in the foregoing, in the frame reproducing mode, the luminance signal which is not skew compensated, the chrominance signal and the composite color still image signal are output from the output terminals 91, 92 and 94, respectively The still image reproducing apparatus which is arranged as described above is capable of carrying out skew compensation without deteriorating the wideband luminance signal even in a case where such a narrow-band delay line as a CCD is used for skew compensation in the field reproducing mode. Further, in the case of the fifth embodiment, the skew correcting action on the high frequency component of the luminance signal is arranged to be performed by utilizing the delay line of a narrow band adapted for skew-compensating the chrominance signal. This arrangement thus permits simplification of structural arrangement and reduction in cost of the apparatus.

While the invention is applied to the skew correction circuit of a still image reproducing apparatus in the case of this embodiment, the invention is likewise advantageously applicable also to a dropout compensation circuit and other signal reproducing and transmitting devices of a video tape recorder or the like.

As described in the foregoing, in accordance with the invention, an information signal having a wide frequency band can be adequately processed by means of the delay element for a narrow band without the fear of deteriorating the signal due to the phasic characteristic of the filter.

What is claimed is:

1. An image signal processing device for processing an image signal composed of a luminance signal having a second frequency band including a frequency component higher than a frequency component included in a first frequency band and a color signal having the frequency component included in the first frequency band, comprising:

a) first separation means, arranged to input the luminance signal, for separating the input luminance signal into a first luminance signal having a frequency component not higher than the frequency component included in the first frequency band and a second luminance signal having a frequency component higher than the frequency component included in the first frequency band to output the first and second luminance signals;

b) first frequency converting means for frequency-converting the second luminance signal output from said first separation means into the first frequency band to output the frequency-converted second luminance signal;

c) multiplexing means, arranged to input the color signal, for multiplexing the input color signal with the second luminance signal output from said first frequency converting means to output a multiplex signal; and d) delay means, having a pass-band for the passage of a signal having the first frequency band, for delaying and outputting the first luminance signal output from said first separation means and the multiplex signal output from said multiplexing means.

2. A device according to claim 1, further comprising:

e) second separation means for separating the multiplex signal delayed by said delay means into the color signal and the second luminance signal to be output;

f) second frequency converting means for frequency-converting the second luminance signal output from said second separation means back into its original frequency band which is higher than the first frequency band; and g) addition means for adding together the first luminance signal delayed by said delay means and the second luminance signal which has been frequency-converted into its original frequency band by said second frequency converting means, to output a sum of the first and second luminance signals.

3. A device according to claim 1, wherein said first separation means includes:

a) a separating filter, arranged to input the image signal, for separating the second luminance signal from the input image signal to output the second luminance signal;

b) a delay element, arranged to input the image signal, for delaying the input image signal to output the delayed image signal; and c) subtraction means for subtracting from the image signal delayed by said delay element the second luminance signal output from said separating filter.

4. A device according to claim 1, wherein the color signal includes a chrominance signal.

5. A device according to claim 2, wherein said second separation means includes a comb filter.

6. A device according to claim 1, wherein the color signal includes a color-difference line-sequential signal.

7. An image signal processing device for processing an image signal composed of a luminance signal having a second frequency band including a frequency component higher than a frequency component included in a first frequency band and first and second color-difference signals having the frequency component included in the first frequency band, comprising:

a) first separation means, arranged to input the luminance signal, for separating the input luminance signal into a first luminance signal having a frequency component not higher than the frequency component included in the first frequency band and a second luminance signal having a frequency component higher than the frequency component included in the first frequency band to output the first and second luminance signals;

b) first multiplexing means, arranged to input the first color-difference signal, for multiplexing the input first color-difference signal with the second luminance signal output from said first separation means to output a first multiplex signal;

c) first balanced modulation means for balanced-modulating the first multiplex signal output from said first multiplexing means by using a first color subcarrier signal into the first frequency band, to output a first balanced-modulated signal;

d) second balanced modulation means, arranged to input the second color-difference signal, for balanced-modulating the input second color-difference signal into the first frequency band by using a second color subcarrier signal the phase of which differs 90 degrees from that of the first color subcarrier signal, to output a second balanced-modulated signal;

e) second multiplexing means for multiplexing the first balanced-modulated signal output from said first balanced modulation means and the second balanced-modulated signal output from said second balanced modulation means, to output a second multiplex signal; and f) delay means, having a pass-band for the passage of a signal having the first frequency band, for delaying the first luminance signal output from said first separation means and the second multiplex signal output from said second multiplexing means.

8. A device according to claim 7, further comprising:

e) second separation means for separating the second multiplex signal delayed by said delay means into a carrier color signal and a second luminance signal to be output;

f) second frequency converting means for frequency-converting the second luminance signal output from said second separation means back into its original frequency band which is higher than the first frequency band; and g) addition means for adding together the first luminance signal delayed by said delay means and the second luminance signal which has been frequency-converted into its original frequency band by said second frequency converting means, to output a sum of the first and second luminance signals.

9. A device according to claim 7, wherein said separation means includes:

a) a separating filter, arranged to input the image signal, for separating the second luminance signal from the input image signal to output the second luminance signal;

b) a delay element, arranged to input the image signal, for delaying the input image signal to output the delayed image signal; and c) subtraction means for subtracting from the image signal delayed by said delay element the second luminance signal output from said separating filter.

* * * * *